June 5, 1956  J. L. STEIGER  2,749,425
IMMERSION HEATER
Filed Jan. 8, 1953
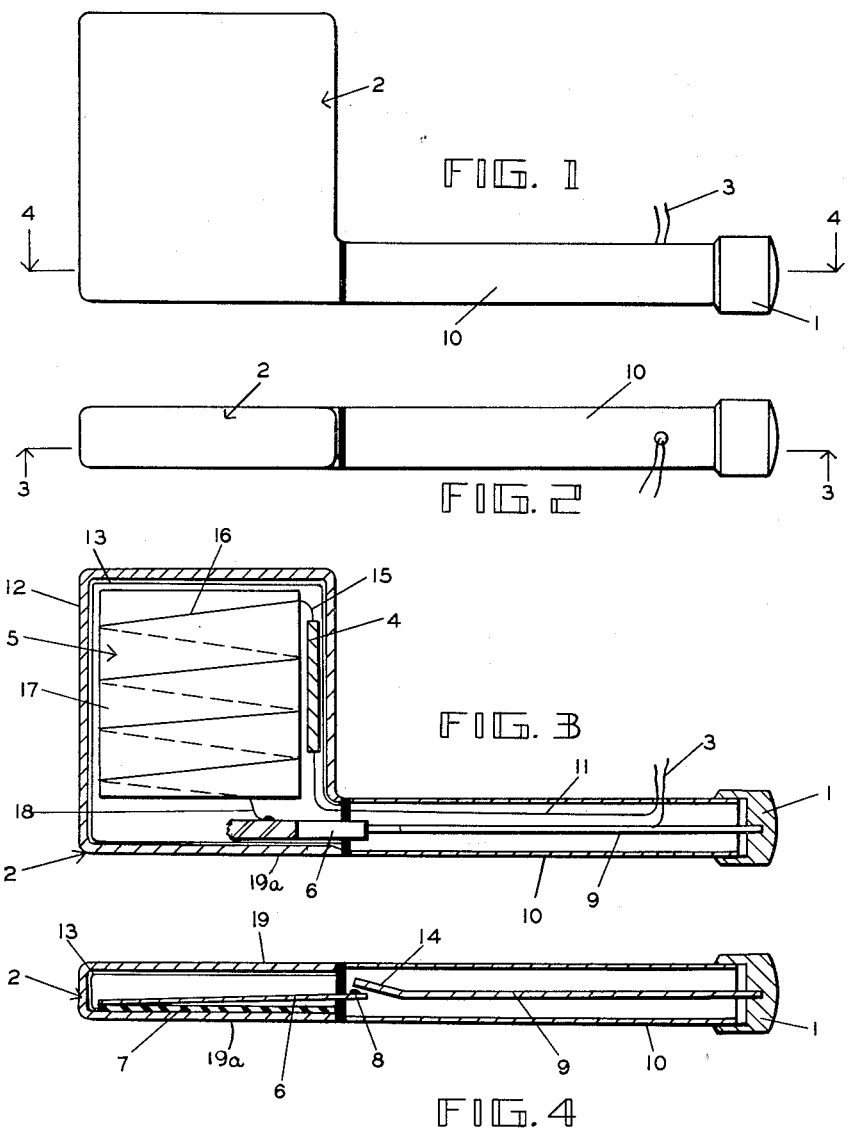
INVENTOR.
JESSIE L. STEIGER
BY
Jerome R. Cox
ATTORNEY United States Patent Office 2,749,425
Patented June 5, 1956

2,749,425

IMMERSION HEATER

Jessie L. Steiger, Chicago, Ill.; now by change of name Jessie L. Sherwood

Application January 8, 1953, Serial No. 330,330

6 Claims. (Cl. 219—41)

The invention illustrated and described in this application relates to electric heaters. It is illustrated by an electric immersion heater particularly suited to the heating or boiling of liquids or for the reheating of cooked or tinned foods.

One of the objects of the invention is to provide a device which will function properly in any position, whether immersed or not, and which will regulate the temperature of the substance being heated accurately.

Through a special arrangement by which I place in one casing both the heating element and the regulator and by which I conduct the heat from the heating element to the regulator it is now possible for the first time to govern quickly and accurately the temperature of the substance being heated. By reason thereof overheating does not occur, the outside of the casing does not get too hot, and consequently one can heat thicker liquids such as milk, soup, cereal, strained vegetables, etc., without danger of burning them.

It is a further object of this invention to permit the manufacture of an electric immersion heater in a small size especially designed to fit into small jars or tins of baby food now on the market. However, while manufacture in a small size is thus a special object of the present invention, it may be made in any size desired and may also be adapted to connect to the electrical supply of an automobile for use when traveling.

It is a further object to regulate the heat in such a device so that the food reaches and remains at the temperature required for the infant so long as the device remains immersed and operative.

It is a further object to adjust the heat at different temperatures as desired and so prevent the overheating of the food and altering of the vitamin content.

A disadvantage of previous immersion heaters designed for comparable purposes has been their inability to properly heat anything but water or to function safely outside of the liquid. With this invention it is not necessary to switch off the electric current when not immersed, and by switching on the current for a few minutes before immersing, the heater sterilizes itself, which is an important factor where babies are concerned. This invention can be used for heating or boiling very small quantities of liquid or foodstuffs as it will even function when only partly immersed or not immersed at all.

In the drawings:

One form of the invention is illustrated in the accompanying drawing, in which:

Fig. 1 is a view in side elevation of the outside contour of the immersion heater;

Fig. 2 is a view in top plan;

Fig. 3 is a view in vertical cross section taken on the line 3—3 of Fig. 2; and

Fig. 4 is a view in horizontal section taken on the line 4—4 of Fig. 1.

The flat thick metal casing 2 constitutes a housing for the heating element 5, for the bi-metallic heat regulating strip 6, and for a piece or strip of fusible metal 4. The bi-metallic regulating strip 6 protrudes from the housing into a hollow staff 10 which contains a length of metal or element 9 which conducts the electric current from the wire 3. The element 9 also is adapted at times to complete the electric current when the bi-metallic strip moves the point 8 into contact therewith. The element 9 serves also to control the operating temperature by adjusting the position of its contact with the bi-metallic strip as will be later more fully explained. At the end of the hollow staff, the element 9 is joined to a knob 1 which may be adjusted on the staff 10 to cause the immersion heater to deliver the amount of heat desired. A layer of electrical insulation 7 is provided between the bi-metallic heat regulating strip and the wall of the casing to prevent electricity from passing from the strip to the casing. The fusible element 4 is connected by an electricity conducting wire with a resistance wire 16 wound on a core 17. The resistance wire 16 is connected by an electricity conducting wire 18 with the bi-metallic heat regulating strip 6.

The fusible element 4 is connected also by an electrical wire 11 with the source of electrical current.

The casing 2 is formed of an outer portion 12 of a metal of relatively high specific heat and an inner layer 13 of a metal of high heat conductivity plated on to the outer layer.

The end 14 of the element 9 is bent as shown. Thus if the knob 1 is pushed in on the staff 10 it moves the element 9 inward so that the contact 8 approaches more closely to said end 14. Moreover, rotation of the knob 1 will rotate the end 14 and adjust its position relative to the contact 8.

In some previous immersion heaters in which an attempt has been made to regulate the temperature, the heating element heated the liquid in which it was immersed and the heated liquid warmed the regulator. In such case the heat of the electric current could not influence the regulator except by the roundabout way through the substance being heated. In some such cases thin metal was used for the casing. In others, the regulator was as far away as possible from the heating element. In others, the heating element and the regulator were built in separate chambers. This roundabout way functions too slowly and causes such heaters to become overheated in certain places and not heated uniformly both inside and outside. As a consequence nothing but water could be heated satisfactorily. In certain other previous immersion heaters it has been the temperature of the heating element which controls the thermostat and thus has been predetermined. Thus such heaters do not control the temperature of the substance to be heated.

In the present invention, when the heating element is energized the regulator is not directly influenced by the temperature of the heating element nor by the temperature of the outside substance but only by the quantity of heat being exchanged to the substance being heated, as indicated by the temperature of the inner wall of the casing. This arrangement permits the delicate regulation of temperature at a predetermined degree and also permits successful operation when only half immersed or absolutely dry.

In the present invention the bi-metallic heat regulating strip is placed close to the heating element and in the same housing. However, the heat of the electric wire is not conducted directly to the bi-metallic strip inasmuch as in such case the action would be too quick and the substance being heated would not be brought to the desired temperature before the regulator would react. The heating element evenly warms the flat wide inner surface of the casing whose outer surface is cooled by the lower temperature of the substance being heated. The inner surface heats the bi-metallic heat regualting strip. Due to the slight lag in time before the heating of the substance being heated by the outside surface of the casing and the slight lag in time in the heating of the bi-metallic strip, I insure that when the outside substance has reached the desired temperature, the bi-metallic strip reacts to break the current. When the temperature of the outside substance begins to drop, the casing temperature has dropped and the regulator quickly reacts and the heater again operates.

A more complete description of some of the details of the construction and operation of this embodiment of my invention follows:

The flat metal casing 2 must be not less than 1/32 of an inch thick and may be made of two metals as shown, or of only one metal. Where it is of two metals, as shown, the outside surface should be of lower heat conductivity than the inner surface. Thus when the casing is made of two different metals the inside should be a metal of good heat conductivity such as copper and the outside a metal such as iron which has a high specific heat but lower conductivity. The outside metal may be galvanized to prevent corrosion. Where two metals are used, they should be closely bonded to each other. Plated metal may be used to good advantage. When plated metal is used, it may be somewhat thinner than otherwise but not less than a minimum of 1/32 of an inch. Where a single metal casing is used the metal should be a good heat conductor such as copper or aluminum so that the heat will be spread quickly and equally over the whole surface of the casing. To distribute the heat more evenly the housing may be filled with an electrically insulating fluid such as oil, silicones, etc. A solid substance such as paraffin which melts below 260° F. can be used inasmuch as this becomes liquid at the operating range. In using a casing of a single metal, the metal may be aluminum. In such case the inner surface should be a better heat conducting surface than the outer. To achieve this, the outer surface may be oxidized, painted, or coated.

The wire 16 of the heating element 5, instead of being wound over a mica core, may be wound over sheet metal which has been painted with fireproof insulating enamel. The inside of the casing may also be insulated with silcone enamel.

I have pointed out that the bi-metallic heat regulating strip 6 is pressed against the inner wall of the casing, but separated by the piece of electrically insulating material 7. An advantage of placing the regulator in the same housing with the heating element is the quick response to changes in temperature due to the short distance from the heating element 5 to the regulator. However, the warming of the bimetallic strip does not come directly from the heat of the heating element 5 but largely by way of the thick metal casing (or through the heat-conducting insulating liquid within the casing if such is used). The regulator, in taking its warmth from the wall of the casing instead of the heating element wire, does not react too quickly and thus the temperature of the outside substance is governed.

As a safeguard against overheating of the immersion heater, in case of possible failure of the regulator, I provide the piece or strip of fusible metal 4, which will melt at a tempearture above the set temperature of the regulator. This element 4 is placed in the circuit within the housing. The metal of this element 4 should have a melting point below 500° F. Newton's metal is suitable.

In certain previous immersion heaters a so-called regulator or fuse was placed at some distance from the heating chamber and was intended to function only when through oversight the immersion heater was not switched off when no longer immersed. However, with the present invention the regulator 6 operates all the time to govern the temperature of the substance being heated whether the heater is immersed or not and the fuse only operates as a protection to prevent the heater blowing out if the regulator is defective.

In the operation of my heater, the knob 1 is pushed in whereupon the contact 8 touches the end 14 and current flows through 3, 9, 14, 8, 6, 13, 16, 15, 4 and 11. This heats the element 5 and thus the casing 2. Provided that at such time the heater is partially or wholly immersed in the substance to be heated, thereupon heat is transferred immediately from the casing to the substance. Heat also flows from the casing as for example from the side of the casing 19a and to some extent from the side 19 to the bimetallic heat regulating strip 6 and causes it to either straighten or bend so that it moves away from the end 14 of the element 9, thus breaking the contact. I so proportion the thickness of the casing and the gap between 6 and 19a that the bimetallic heat regulating strip 6 accurately measures and is controlled by the temperature of substance being heated and so controls quickly and accurately the heating of the substance without underheating or overheating.

The regulating function of the knob 1 at the end or side of the hollow staff 10 is performed by turning the knob 1 and element 9 or by slightly pushing the knob into or pulling it out of the staff, the amount of adjustment to be indicated by proper marking. The knob acts, through the element 9 to which it is attached, to adjust the position at which the electric contact 8 touches it or to change the tension with which the bimetallic strip 6 bears on the element 9. The contact 8 normally touches the element 9 so the current can go through However, if too much heat is produced a bending motion of the bimetallic strip will open the contact and break the current or loosen the contact and reduce the current. An alternative construction could be made however, in which the current flows through when the strip is bent and ceases when the strip becomes straight. In manufacture, a quick-break switch may be used in connection with this arrangement.

The hollow staff 10 may be made of a thinner material than the casing, if desired. It is covered with a heat resisting material which together with the insulation between casing 2 and staff 10 enables the user to handle the staff without discomfort.

It is to be understood that the above described embodiments of my invention are for the purpose of illustration only and various changes may be made therein without departing from the spirit and scope of my invention as defined by the following claims.

I claim:

1. In an electric immersion heater, a casing made of two layers of aluminum, the outer surface having a lower heat conducting characteristic than the inner surface.

2. In an immersion heater, a metallic casing having at least two surfaces of different heat conductance, the outer surface having a lower heat conducting characteristic than the inner surface, an electrical resistance element of high wattage enveloped by said casing, heat responsive means positioned within said casing and adjacent to the inner surface of said casing and electrically connected to said electrical resistance heating element, and said heat responsive means directly effected by thermal conductance through said casing to critically control the temperature of said heating element.

3. In an electric immersion heater, a differentially heat conducting metallic casing comprising an inner layer and an outer layer, said inner layer consisting of copper and said outer layer consisting of a lower heat conducting material, a resistance element enveloped by said metallic casing, and heat responsive means positioned adjacent to said inner layer and electrically connected to said resistance element.

4. In an electric immersion heater, an aluminum casing comprising an inner layer and an outer layer contiguously bonded together, said inner layer having a heat conductivity greater than the heat conductivity of the outer layer, said casing having an undivided interior chamber, a resistance element enveloped by said chamber, heat responsive means positioned in said chamber and adja-